United States Patent [19]

Neale

[11] Patent Number: 5,137,329
[45] Date of Patent: Aug. 11, 1992

[54] ARTICULATED LUMBAR SUPPORT FOR A SEAT

[75] Inventor: Colin G. Neale, Dearborn Heights, Mich.

[73] Assignee: Ritter-Smith Incorporated, Southfield, Mich.

[21] Appl. No.: 719,957

[22] Filed: Jun. 24, 1991

[51] Int. Cl.$^5$ ............................................. A47C 7/14
[52] U.S. Cl. .......................... 297/284 E; 297/DIG. 3; 297/284 R
[58] Field of Search .......... 297/284 R, 284 E, DIG. 3

[56] References Cited

U.S. PATENT DOCUMENTS

| | | | |
|---|---|---|---|
| 3,652,126 | 3/1972 | Folling | 297/284 E |
| 4,634,179 | 1/1987 | Hashimoto et al. | 297/284 E |
| 4,690,456 | 9/1987 | Chiba et al. | 297/284 E |
| 4,699,424 | 10/1987 | Andres et al. | 297/284 E |
| 4,720,146 | 1/1988 | Mawbey et al. | 297/284 E X |
| 4,778,218 | 10/1988 | Suman | 297/284 E X |
| 4,807,931 | 2/1989 | Ishida et al. | 297/284 E |
| 4,965,899 | 10/1990 | Sekido et al. | 297/284 E |

*Primary Examiner*—Peter A. Aschenbrenner
*Attorney, Agent, or Firm*—Joseph G. Nauman

[57] ABSTRACT

A user adjustable lumbar support apparatus for inclusion in a seat back, comprising an essentially rigid back plate having front and rear surfaces and adapted to extend vertically within a seat back, a front plate having a front and back surface and having an orthotic lumbar support contour at its said front surface, the contour preferrably being generally concave side-to-side and convex top-to-bottom, and a multi-chambered fluid actuator including at least a pair of independently inflatable chambers arranged vertically one chamber above the other, together with elastic means supporting the actuator and the front plate in assembled relationship to the back plate with the chambers between said plates to accommodate relative motion between the plates as the chambers are inflated and deflated. The fluid actuator preferrably is a distendable chamber member containing separated enclosed fluid receiving chambers. Fluid under pressure is admitted and vented separately to and from each chamber to alter the positional relationship of the front plate to the back plate so the lumbar support contour can be adjusted to a position giving optimum support at a desired elevation along the seat back. An elastic strap confines the fluid chamber member between the plates, such strap being attached at its ends to one of the plates and engaged with the other plate to urge the plates together with the fluid chamber member between the plates. There is a resilient support for the back plate about a generally vertical axis of the seat back to allow compliant rotational motion of the support assembly within the seat back in response to like motion of the torso of a person seated against the seat back.

9 Claims, 6 Drawing Sheets

ARTICULATED LUMBAR SUPPORT FOR A SEAT

This invention relates to adjustable seating members, and specifically to a lumbar support, particularly for automotive seating or the like, which may, be articulated to accommodate the lumbar support to the size, posture, etc. of a person using the seating with which the lumbar support is associated, and which will accommodate with conformity twisting -types of motion of the person using the seating.

BACKGROUND OF THE INVENTION

It is recognized that substantially minimizing back problems can be accomplished by correct support of the anterior convexity of the lower lumbar region of a person, particularly when that person is seated for substantial periods of time, such as riding in a vehicle. Discussion of this subject matter is found for example in U.S. Pat. No. 4,597,386 which relates to a lumbar support device, preferably portable. Efforts have been made to incorporate lumbar support into vehicle seating, for example U.S. Pat. No. 4,690,456 shows and describes an arrangement in which a pair of plates are hinged to each other near their top margins, and a pair of selectively inflatable air bags are placed between these plates, the whole being incorporated within the construction of a vehicle seat. The result, however, is merely to distort the upholstered seat back in a general way, without regard to the need for a specific orthotic contoured support. Similar seating supports incorporating flexible strips and a mechanical distortion of them are available for use in both household and automotive seating, of which an example is disclosed in U.S. Pat. No. 4,354,709.

Another consideration is cost and complexity of manufacture. Prior art devices are, in general, rather expensive to make and install, thus discouraging their adoption over a wide range of vehicle types and models. There is a need for an adjustable lumbar support device which is economical to manufacture, install and service, which is readily adjusted, preferably over a substantial range of motion, to the unique lower back geometry of the person using the seating, and which will conform temporarily to twisting motions or the like as the user maneuvers his/her torso while seated against the support device.

SUMMARY OF THE INVENTION

The present invention provides an adjustable lumbar support for seating which is constructed essentially of three related elements, a back plate which can be easily attached to seating structural members, a front plate member which has a frontal surface contoured to engage, substantially continuously, the lower spinal column and the adjacent latissimus dorsi of the person using the seat, e.g. an orthotic surface, and a simple motor means in the form of a multi-chambered fluid actuator (preferably pneumatic) which controls the position of the front plate member with respect to the reference or back plate through at least fore and aft movement relative to the seat in which the device is mounted. These three elements are joined by an elastic strap which locates the front plate member, confines the motor means in position between the two plate members, and returns the device to a predetermined normal position after it has been deployed.

The actuator includes at least separate upper and lower chambers, each of which can be selectively pressurized or evacuated by means of suitable valving connected to a source of fluid under pressure (e.g. a small air pump). In this way, the orthotically shaped front plate member can be tilted fore and aft within the seat back. The motion of the front plate is somewhat complex, in that it is urged against the fluid actuator by the elastic retaining strap. Inflation of one chamber will move the corresponding region of the front plate in a pivoting motion about the other chamber, or about the intersection of the front and back plates on the opposite edge of the other chamber, depending upon the degree of inflation of such other chamber. Simultaneous inflation and/or deflation of both actuator chambers will cause corresponding fore/aft motion of the front plate. The back or reference plate member may include suitably shaped base parts which provide a base position or location which the chambers of the fluid motor means use as a reference. Modulation of the actuator chambers will causes changes in the seat back profile, resulting in a vertical displacement of the center of pressure on the lower lumbar region of the spine.

The entire apparatus is supported, under tension, within the seat in such manner that the apparatus can twist or turn to some degree, with a bias toward return to its normal suspended position. This allows the seated user to maneuver his/her torso while seated against the seat back in which the apparatus is suspended. Thus, when such motion of the torso occurs, the device accommodates it, rather than becoming a point of discomfort.

The principal object of the invention, therefore, is to provide a user adjustable lumbar support apparatus for inclusion in a seat back, the apparatus comprising an essentially rigid back plate having front and rear surfaces and adapted to extend vertically within a seat back, a front plate having a front and back surface and having an orthotic lumbar support contour at its said front surface, the contour preferably being generally concave side-to-side and convex top-to-bottom, and a multi-chambered fluid actuator including at least a pair of independently inflatable chambers arranged vertically one chamber above the other, together with a means supporting the actuator and the front plate in assembled relationship to the back plate with the chambers between said plates, and the supporting means being elastic to accommodate relative motion between the plates as the chambers are inflated and deflated; to provide such a fluid actuator in the form of a distendable fluid chamber member containing separated enclosed fluid receiving chambers; to provide for admitting and venting fluid under pressure separately to and from each of the chambers for selectively inflating and deflating them, thus to alter the positional relationship of the front plate to the back plate whereby the lumbar support contour can be adjusted by a person using the seat back to a position giving optimum support at a desired elevation along the seat back; to provide an elastic strap confining the fluid chamber member between said plates, such strap being attached at its ends to one of the plates and engaged with the other plate so as to urge the plates together with the fluid chamber member between the plates; and to provide resilient support for the back plate about a generally vertical axis of the seat back to allow compliant rotational motion of the support assembly within the seat back in response to like motion of the torso of a person seated against the seat back.

DESCRIPTION OF THE PREFERRED EMBODIMENT

Figure 1:
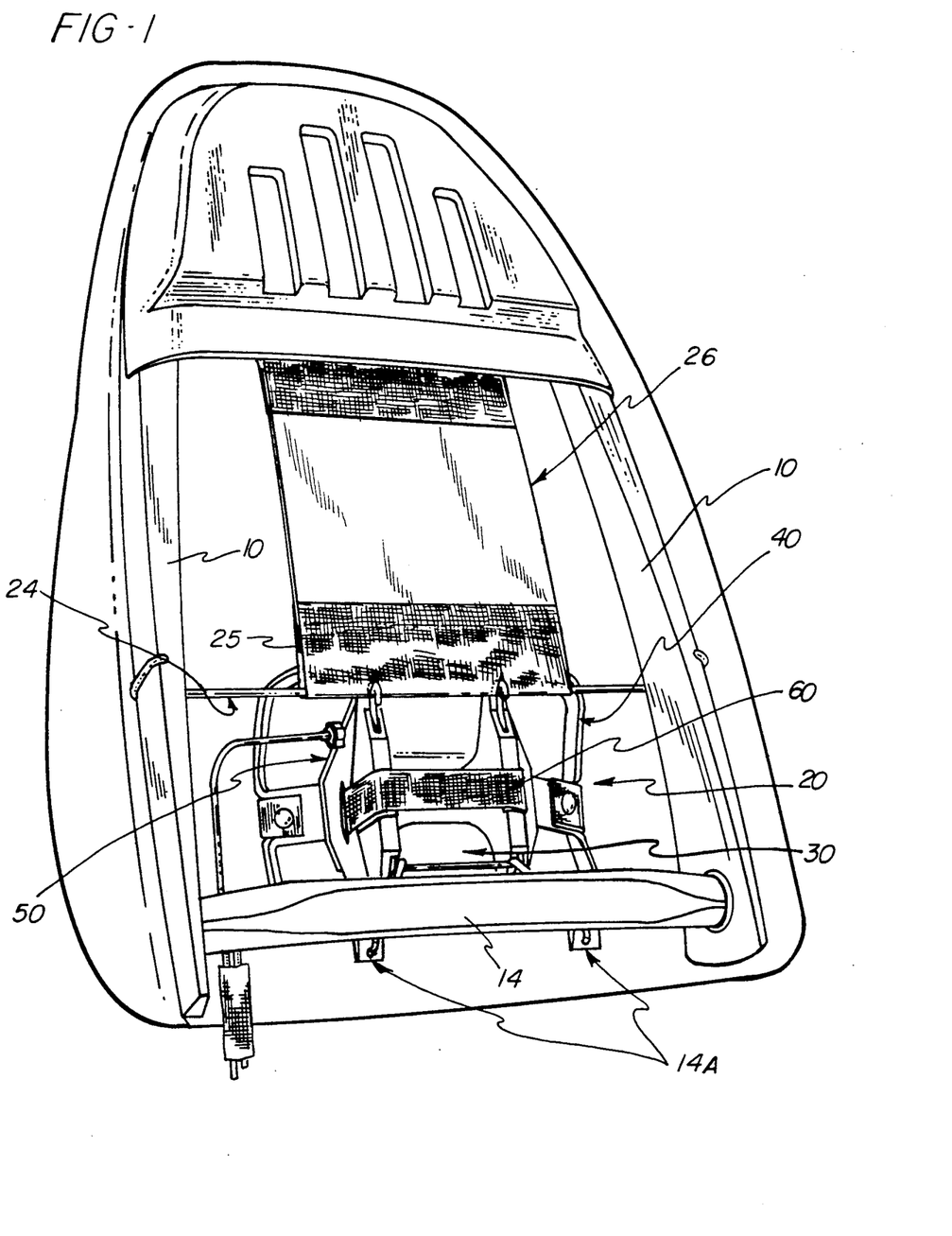
FIG. 1 is a rear perspective view of a typical automotive seat, with the rear cover panel removed to reveal the device of the invention mounted within the seat back.

FIG. 1 shows a typical vehicle seat back, including a frame work comprising rigid side members 10 an upper cross member (not shown) which may be a continuation of the side members or tubes, and a lower cross member 14, connected to the side members. It will be understood that the rear of the seat back is normally finished with an upholstered panel which is omitted to show the interior of the seat back. Suitable brackets such as shown at 14A may be provided on the seat frame, having apertures into which springs or other components can be hooked.

The adjustable lumbar support apparatus is indicated by the general reference numeral 20, and is supported by a generally U-shaped rod (or heavy wire) 22 having side lengths 22A and 22B which engage with the support (as later described) and a bottom length 22C which is attached by short connecting wires 23 to brackets 14A on the lower seat back cross member 14. The upper ends of wire 22 hook onto a stay wire 24 which in turn is hooked at its ends about the about the seat back side members 10. An elastomeric panel 26, having fabric attachment sleeves 25 along its upper and lower edges, connects the assembly to the top of the seat frame via wires 27 and 28. Thus, the rod or wire member 22 is held in vertical tension within the seat back, and provides a mounting for the lumbar support apparatus which is easy to install, and to remove for service or replacement. This form of mounting also imparts a certain degree of mobility to the support apparatus 20 about a generally vertical axis through the center of the seat back.

Figure 2:
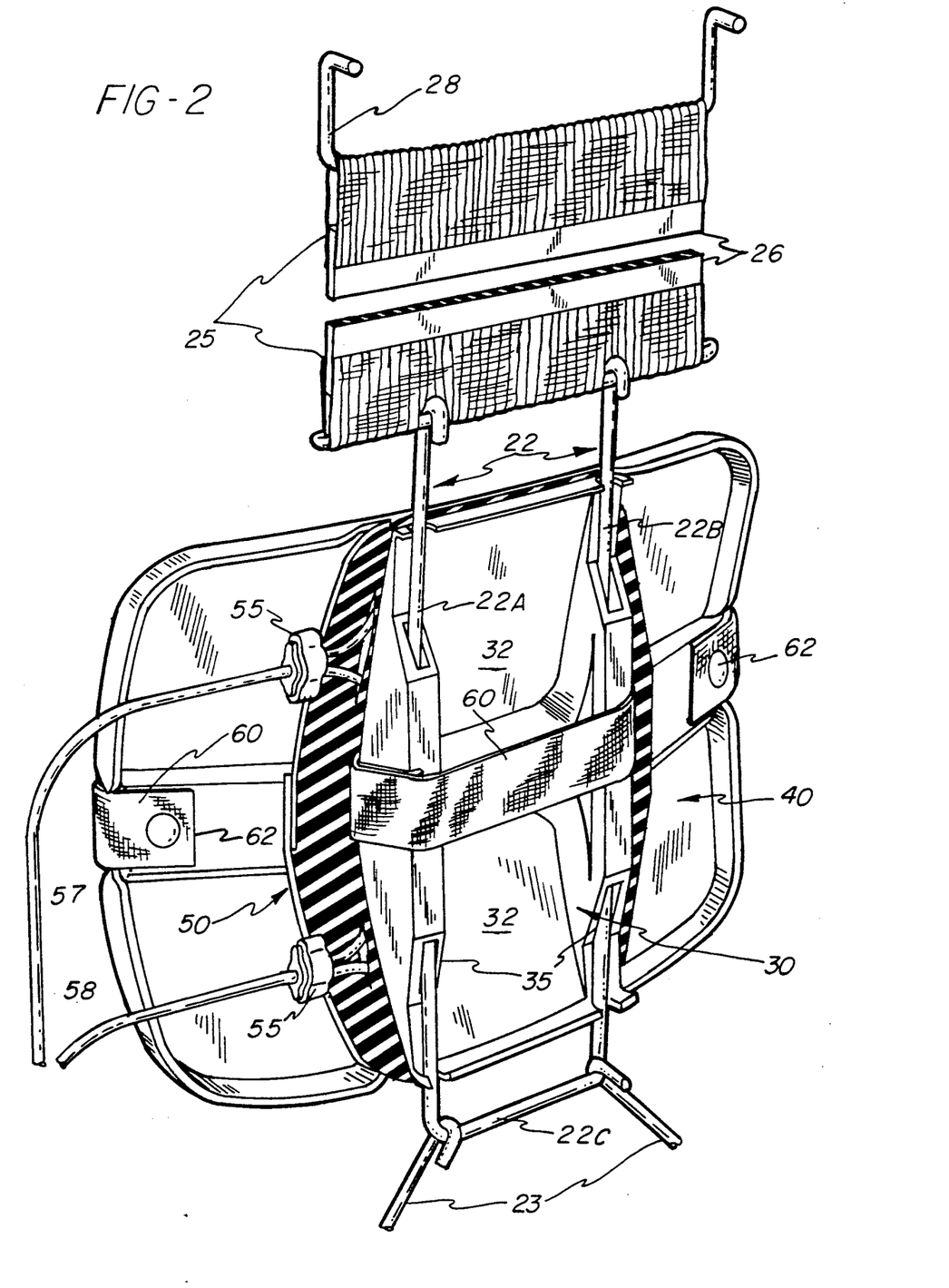
FIG. 2 is an enlarged rear perspective view of the adjustable lumbar support apparatus itself, including the associated mounting structure and the tubing through which fluid is supplied/exhausted from the chambers of the motor means.

The three principal elements of the lumbar support are shown in FIG. 2, along with parts of the mounting therefore. These elements are a back or reference plate 30, a front plate 40 having an orthotically shaped frontal surface, and a fluid actuator member 50.

Figures 6, 7:
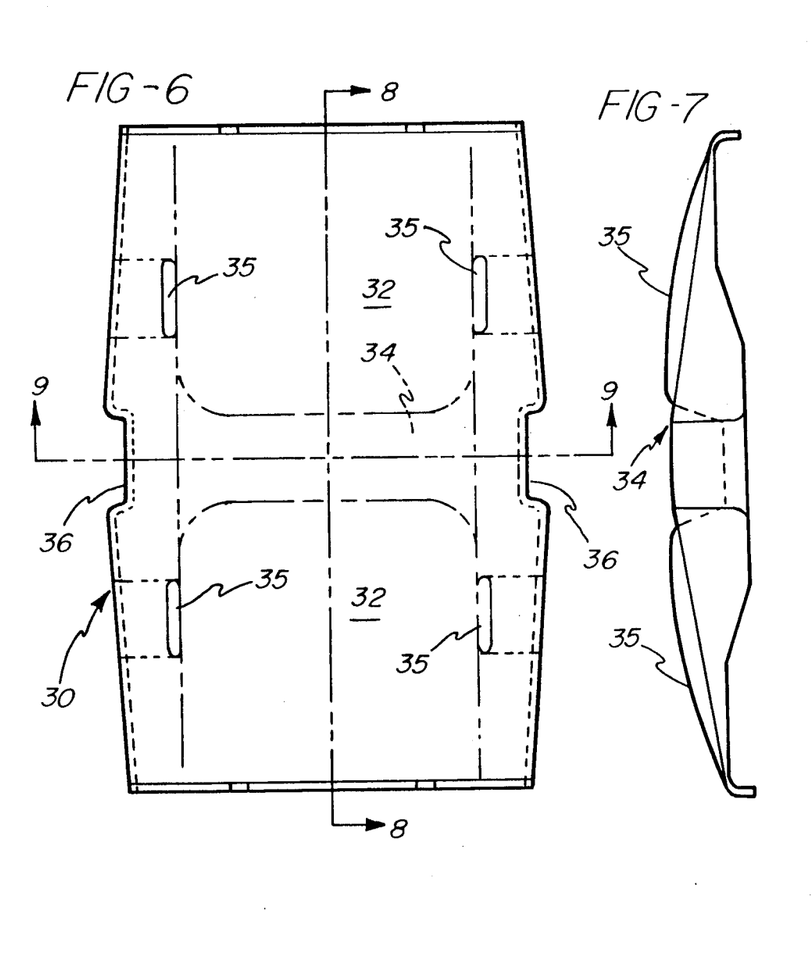
FIG. 6 is a front view of the back or reference plate.
FIG. 7 is an side view of the back plate.
Figure 8:
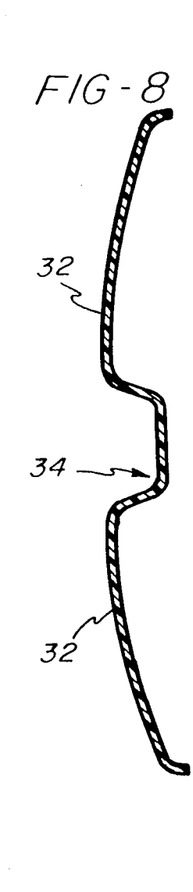
FIG. 8 is a vertical cross-section view taken along line 8—8 of FIG. 6.
Figure 9:
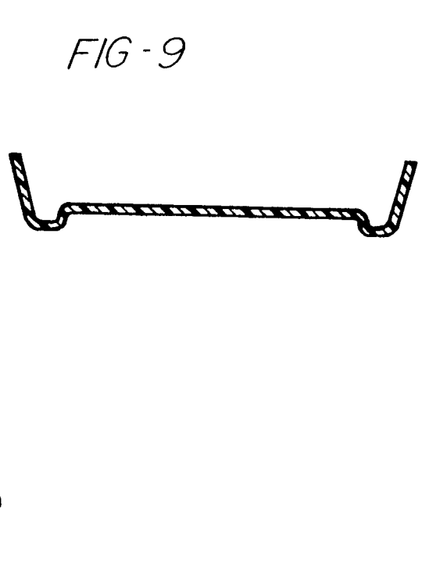
FIG. 9 is a transverse cross-section view taken along line 9—9 of FIG. 6.
Figure 10:
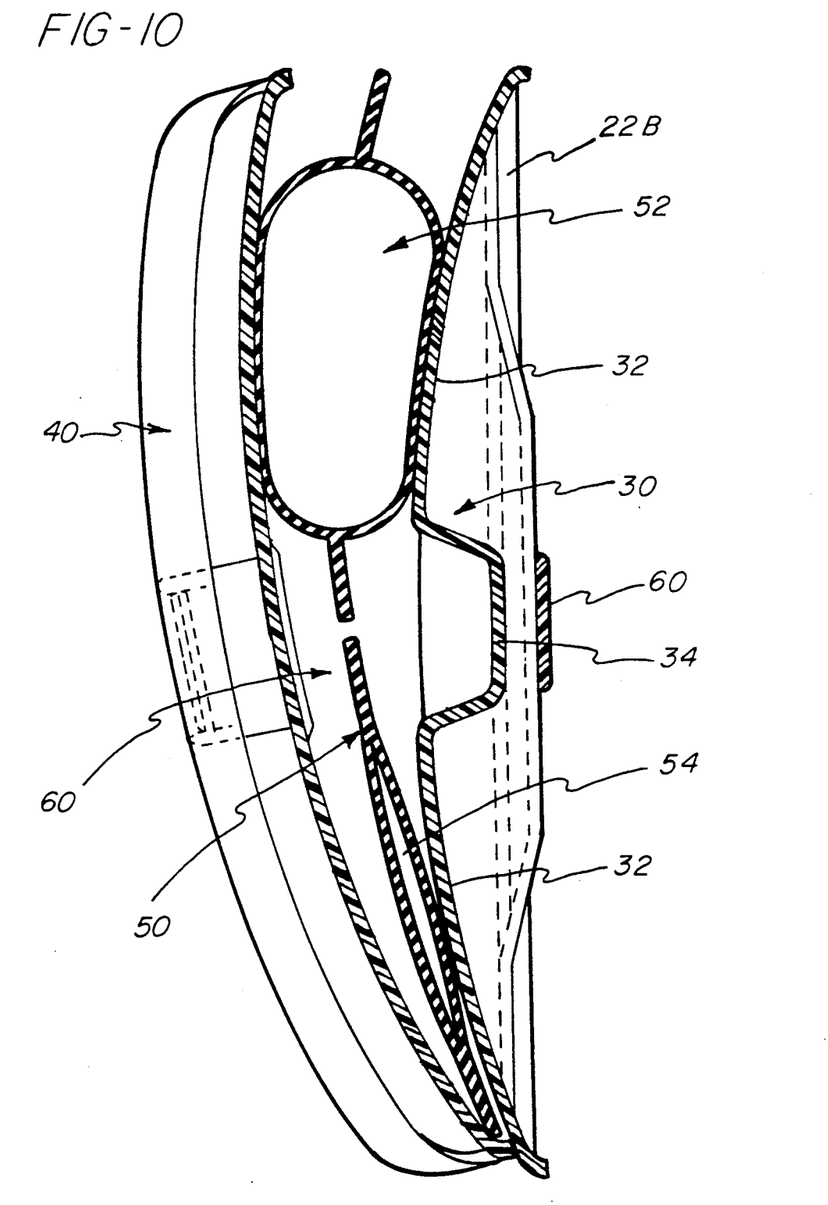
FIG. 10 is a vertical centerline section taken through the apparatus, showing the fluid actuator with its upper chamber expanded or deployed.

Details of back or reference plate 30 are shown in FIGS. 6–8. The back plate is preferably a rigid (molded or stamped) member having symmetrically shaped panels or platforms 32 on its front surface providing predetermined reference surfaces against which said actuator means can react, as later described; the panels 32 are separated by a transverse recess 33. At opposite edges of panels 32 are slots 35 which provide locating passages for the mounting rod 22, and at opposite ends of recess 32 there are notches or recesses 36 in the sides of plate 30 for locating an elastic strap (later described). The U-shaped rod member 22 thus passes through each side of back plate 30 and provides suspension for the entire unit within the seat back. Suitable kinks in rod member 22 or a suitable retaining clip attached thereto (not shown), will retain the vertical position of plate 30 on rod member 22.

Figures 3, 4, 5:
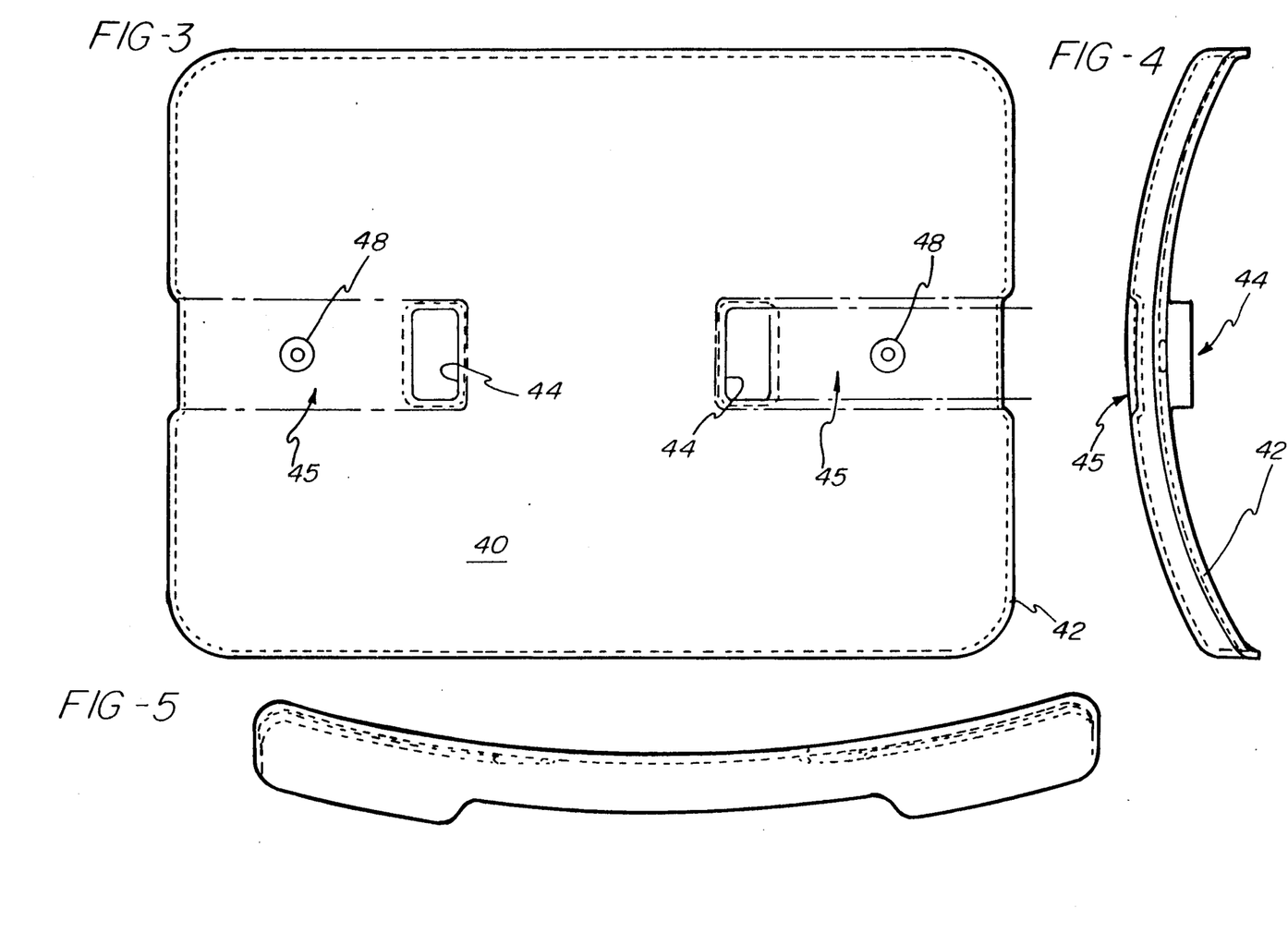
FIG. 3 is a front view of the orthotically shaped front plate member.
FIG. 4 is a side elevational view taken from the right of FIG. 3.
FIG. 5 is an end view taken from the bottom of FIG. 3.

Front plate 40, as seen in FIGS. 3–5, has its front surface contoured (as viewed from its front) to be concave in a transverse direction (side to side; see FIG. 4), and concave in a vertical direction (top to bottom; see FIG. 5), presenting a continuous, relatively wide, orthotic support for the lower lumbar regions of the spinal column and the adjacent muscular regions, essentially the lower latissimus dorsi. Plate 40 preferably is also fairly stiff, e.g. essentially inflexible, and has a flange structure 42 surrounding most of its periphery. On opposite sides of its center, plate 40 has a pair of apertures 44, preferably rectangular as shown, from Which extend lateral recesses or passages 45 in the front surface of the plate. These recesses merge into and extend around the flange structure 42. Within each recess 45, on the rear surface of the plate, is a fastener 48, for example a base part of a conventional snap fastener.

Figure 11:
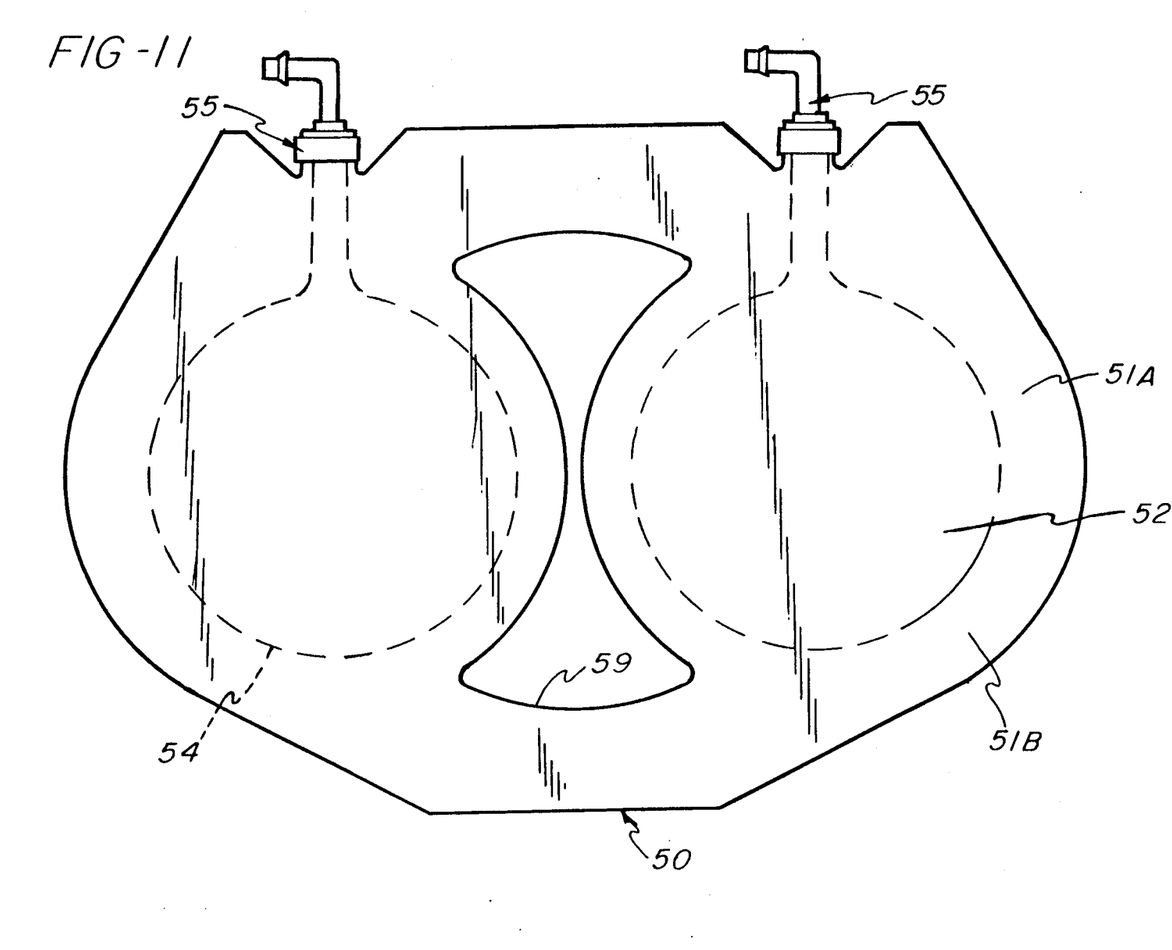
FIG. 11 is a plan view of the fluid actuator, with a fragment of one chamber broken away.

The fluid actuator 50 may be formed in a number of different ways, as will be apparent to those skilled in the art. The embodiment illustrated (FIG. 11) is constructed of joined vulcanized sheets of elastomeric material 51A and 51B which comprise a distendable chamber member separated internally into expansible chambers 52 (the upper chamber) and 54 (the lower chamber). Each chamber is provided with a connector 55 to which tubes 57 and 58 are attached. The shape of the actuator member is such that the chambers 52 and 54 match, and rest against, the back plate panels 32, and the periphery of the actuator material overlaps the side edges of back plate 30 as seen in FIG. 2. The region between the chambers is separated as indicated to minimize interaction when one or the other of the chambers is inflated or deflated. Slots 59 are formed in these regions of the actuator material, spaced apart corresponding to the spacing of recessed passages 36 in back plate 30 and the spacing of apertures 44 in the front plate.

The three principal elements of the apparatus are assembled by an elastic strap 60 of resilient material, having fasteners 62 at its ends to engage with the fasteners 48 on front plate 40. As can be seen from FIG. 2, the ends of strap 60 pass around the recesses in flange structure 42, across the recesses passages 45, through apertures 44, through slots 59 in the fluid actuator, along recesses 36 in back plate 30, and across the rear of the back plate.

Flow through tubes 57 and 58 will control the pressure within chambers 52 and 54, and thus the inflation of those chambers. Assuming neither chamber is inflated, admitting air under pressure into upper chamber 52 will cause front plate 40 to tilt forward, pivoting around the line where it contacts back plate 30 near its bottom, against the restraining force of strap 60. Conversely, pressurizing lower chamber 54 with upper chamber 52 deflated will produce a more rearward tilt of front plate 40. Obviously, various intermediate conditions may be attained by selective pressurizing of both chambers. Suitable arrangements for either manual or motorized pressurizing are disclosed in U.S. Pat. Nos. 4,616,676 and 4,792,186 issued to Cooper Tire & Rubber Company.

It will be appreciated, particularly from viewing FIGS. 1 and 2, that the support apparatus 20, as a unit, is suspended under tension within the seat back, to present the front orthotic surface at the lower portion of the seat back where its shape will conform the overlaid upholstery to the lower lumbar region of the seated person. It is desirable that the front surface of plate 40 be positioned as close as possible to the trim (exterior) surface of the seat back upholstery. In an actual embodiment, the outboard edges of panel 40 are approximately one inch behind such trim surface. Once the user is seated, he/she may manipulate the apparatus by tilting the front plate forward/rearward until the form "fits" the seat back upholstery comfortably against the lower lumbar region of the seated person. If desired, the entire unit can be moved forward/backward somewhat against the user by inflating/deflating both chambers. If the person twists in the seat, as while driving a vehicle, such twisting motion of the back while continuing to rest against the support and seat back, will cause the entire support unit to twist in its mounting, due to the elastomeric panel 26 and the combination of spring wire connections and other elastomeric elements, and the conformable nature of the upholstery. Thus, the support apparatus will comply to this twisting displacement and follow the movement of the lumbar region, returning to normal position as the person does so.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A lumbar support assembly for inclusion in a seat back, comprising
   an essentially rigid back plate having front and rear surfaces and means for flexibly supporting said back plate within a seat back,
   fluid driven actuator means defining at least two independently inflatable chambers arranged one chamber above the other,
   means supporting said chambers at said front surface of said back plate,
   an essentially rigid front plate having a front surface and a back surface, said front surface having an orthotic lumbar support contour,
   means flexibly supporting said front plate in assembled relationship to said said back plate with said front plate back surface facing said chambers,
   means for admitting and venting fluid under pressure separately to said chambers for selectively inflating said chambers to alter the positional relationship of said front plate to said back plate, separately to said chambers for selectively inflating said chambers to alter the positional relationship of said front plate to said back plate,
   whereby said lumber support contour can be adjusted to the posture of a person using the seat back.

2. A support device as defined in claim 1, further including
   means locating said actuator means against said back plate to provide a defined reference against which said chamber means reacts to locate said support contour.

3. A support device as defined in claim 1, wherein said back plate includes platforms on its front surface providing predetermined reference surfaces against which said actuator means can react.

4. A support device as defined in claim 1, wherein said chamber defining means comprises a distendable fluid chamber member containing separated enclosed fluid receiving chambers,
   means confining said fluid chamber member between said plates with said chambers aligned between upper and lower portions of said plates.

5. A support device as defined in claim 1, said supporting means comprising an elastic strap means attached at its ends to one of said plates and threaded around the other of said plates to urge said plates together holding said actuator means between them.

6. A user adjustable lumbar support assembly for inclusion in a seat back, comprising
   an essentially rigid back plate having front and rear surfaces and means for supporting said back plate extending vertically within a seat back,
   an essentially rigid front plate having a front surface and a back surface and having an orthotic lumbar support contour formed on its said front surface,
   means defining a pair of independently in flatable chambers arranged vertically one chamber above the other,
   flexible means supporting said chambers at said front surface of said back plate and supporting said front plate in assembled relationship to said back plate with said front plate back surface facing said chambers,
   mans for admitting and venting fluid under pressure separately to and from each of said chambers for selectively inflating and deflating said chambers to alter the positional relationship of said front plate to said back plate,
   whereby said lumber support contour can be adjusted by a person using the eat back to a position giving optimum lumber support at a desired elevation along the seat back.

7. A lumbar support assembly as defined in claim 6, wherein said means for supporting said back plate is resilient about a generally vertical axis of the seat back to allow compliant rotational motion of said support assembly within the seat back in response to like motion of the torso of a person seated against the seat back.

8. A user adjustable lumbar support apparatus for inclusion in a seat back, comprising
   an essentially rigid back plate having front and rear surfaces and adapted to extend vertically within a seat back,
   a front plate having a front and back surface and having an orthotic lumbar support contour at its said front surface,
   a multi-chambered fluid actuator including at least a pair of independently inflatable chambers arranged vertically one chamber above the other,
   means supporting said actuator and said front plate in assembled relationship to said back plate with said chambers between said plates, said supporting means being elastic to accommodate relative motion between said plates as said chambers are inflated and deflated, means for admitting and venting fluid under pressure separately to and from each of said chambers for selectively inflating and deflating said chambers to alter the positional relationship of said front plate to said back plate, whereby said lumbar support contour can be adjusted by a person using the seat back to a position giving optimum lumbar support at a desired elevation along the seat back, and resilient means for supporting said back plate about a generally vertical axis of the seat back to allow compliant rotational motion of said support assembly within the seat back in response to like motion of the torso of a person seated against the seat back.

9. A support device as defined in claim 8, wherein said fluid actuator comprises a distendable fluid chamber member containing separated enclosed fluid receiving chambers, said elastic means supporting said fluid chamber member between said plates includes an elastic strap attached at its ends to one of said plates and engaged with the other said plate so as to urge the plates together with said fluid chamber member between said plates.

* * * * *